(12) United States Patent
Arnold et al.

(10) Patent No.: US 8,989,974 B2
(45) Date of Patent: Mar. 24, 2015

(54) METHOD FOR THE OPERATION OF A TRANSMISSION DEVICE IN A VEHICLE DRIVE TRAIN, COMPRISING AT LEAST ONE FORM-FITTING SHIFTING ELEMENT AND MULTIPLE FRICTIONALLY ENGAGED SHIFTING ELEMENTS

(75) Inventors: Jörg Arnold, Immenstaad (DE); Valentine Herbeth, Friedrichshafen (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 13/991,699

(22) PCT Filed: Nov. 7, 2011

(86) PCT No.: PCT/EP2011/069555
§ 371 (c)(1),
(2), (4) Date: Jun. 26, 2013

(87) PCT Pub. No.: WO2012/079845
PCT Pub. Date: Jun. 21, 2012

(65) Prior Publication Data
US 2013/0268169 A1    Oct. 10, 2013

(30) Foreign Application Priority Data

Dec. 14, 2010  (DE) .......................... 10 2010 063 028

(51) Int. Cl.
*G06F 7/00* (2006.01)
*F16H 61/68* (2006.01)
(Continued)

(52) U.S. Cl.
CPC ................ *F16H 61/68* (2013.01); *F16H 61/08* (2013.01); *F16H 61/0437* (2013.01); *F16H 2061/0474* (2013.01); *F16H 2200/2064* (2013.01); *F16H 2306/44* (2013.01); *F16H 2306/46* (2013.01)
USPC ............................................. 701/55; 701/51

(58) Field of Classification Search
CPC ....... B60W 10/06; B60W 10/08; F16H 61/68; F16H 61/0437; F16H 61/08; F16H 2061/0474
USPC ....................................................... 701/51, 55
See application file for complete search history.

(56) References Cited

U.S. PATENT DOCUMENTS 6,357,289 B1    3/2002  Futawatari
6,699,156 B2 *  3/2004  Steinhauser et al. .......... 477/148
(Continued)

FOREIGN PATENT DOCUMENTS

DE    100 39 922 A1    4/2001
DE    101 20 899 A1    10/2002
(Continued)

OTHER PUBLICATIONS

German Search Report Corresponding to 10 2010 063 027.6 mailed Oct. 10, 2011.
(Continued)

*Primary Examiner* — Thomas Tarcza
*Assistant Examiner* — Kevin Myhre
(74) *Attorney, Agent, or Firm* — Davis & Bujold, PLLC; Michael J. Bujold (57) ABSTRACT

When a request is made to change gears, the form-fitting shifting element being disengaged, for the requested gear change, is disengaged at a predefined target disengagement moment following the target disengagement moment. When the gear is actually changed, an actual disengagement moment is determined based on when the form-fitting shifting element begins disengaging and a transmission operating state variable. If there is a deviation between the actual moment and the target moment of disengagement, then the target disengagement moment is modified by a time value, and the moment when the form-fitting shifting element begins to be actuated is shifted in time in relation to the target moment of disengagement and/or actuation of the shifting element to be connected is adjusted to a determined characteristic of the operating state of the form-fitting shifting element to be disconnected such that it is disengaged approximately at the target disengagement moment.

14 Claims, 2 Drawing Sheets

(51) Int. Cl.
*F16H 61/08* (2006.01)
*F16H 61/04* (2006.01)

(56) References Cited

U.S. PATENT DOCUMENTS

| | | | |
|---|---|---|---|
| 7,789,792 | B2 | 9/2010 | Kamm et al. |
| 8,257,215 | B2 | 9/2012 | Borntraeger |
| 8,394,000 | B2 | 3/2013 | Popp et al. |
| 8,398,522 | B2 | 3/2013 | Bauknecht et al. |
| 2004/0152563 | A1 | 8/2004 | Dreibholz et al. |
| 2011/0263380 | A1 | 10/2011 | Cuppers et al. |
| 2011/0284335 | A1 | 11/2011 | Arnold et al. |
| 2011/0301819 | A1 | 12/2011 | Arnold et al. |
| 2012/0022752 | A1 | 1/2012 | Arnold et al. |
| 2012/0029778 | A1 | 2/2012 | Arnold et al. |
| 2012/0037472 | A1 | 2/2012 | Rosemeier et al. |
| 2012/0135838 | A1 | 5/2012 | Cuppers et al. |

FOREIGN PATENT DOCUMENTS

| | | |
|---|---|---|
| DE | 10 2005 002 337 A1 | 8/2006 |
| DE | 10 2007 005 438 A1 | 8/2008 |
| DE | 10 2008 000 254 A1 | 8/2008 |
| DE | 10 2008 000 209 A1 | 8/2009 |
| DE | 10 2008 000 429 A1 | 9/2009 |
| DE | 10 2008 001 566 A1 | 11/2009 |
| DE | 10 2008 001 567 A1 | 11/2009 |
| DE | 10 2008 040 918 A1 | 2/2010 |
| DE | 10 2008 043 676 A1 | 5/2010 |
| DE | 10 2008 054 635 A1 | 6/2010 |
| DE | 10 2009 000 252 A1 | 7/2010 |
| DE | 10 2009 000 254 A1 | 7/2010 |
| DE | 10 2009 002 203 A1 | 10/2010 |
| DE | 10 2009 002 205 A1 | 10/2010 |
| DE | 10 2009 002 206 A1 | 10/2010 |
| DE | 10 2009 002 661 A1 | 10/2010 |
| DE | 10 2009 017 226 A1 | 10/2010 |
| DE | 10 2009 026 545 A1 | 12/2010 |
| DE | 10 2009 028 305 A1 | 2/2011 |
| EP | 1 705 406 A1 | 9/2006 |
| EP | 1 752 689 A2 | 2/2007 |
| EP | 1 767 829 A2 | 3/2007 |
| WO | 2006/074707 A1 | 7/2006 |
| WO | 2010/081820 A1 | 7/2010 |
| WO | 2010/115806 A1 | 10/2010 |

OTHER PUBLICATIONS

German Search Report Corresponding to 10 2010 063 029.2 mailed Jun. 24, 2011.
German Search Report Corresponding to 10 2010 063 028.4 mailed Jun. 22, 2011.
International Search Report Corresponding to PCT/EP2011/069581 mailed Dec. 30, 2011.
International Search Report Corresponding to PCT/EP2011/069580 mailed Dec. 30, 2011.
International Search Report Corresponding to PCT/EP2011/069555 mailed Feb. 2, 2012.
Written Opinion Corresponding to PCT/EP2011/069581 Dec. 30, 2011.
Written Opinion Corresponding to PCT/EP2011/069580 Dec. 30, 2011.
Written Opinion Corresponding to PCT/EP2011/069555 mailed Feb. 2, 2012.
International Preliminary Report Concerning Patentability Corresponding to PCT/EP2011/069580 mailed Mar. 19, 2013.

\* cited by examiner

Fig. 1

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

METHOD FOR THE OPERATION OF A TRANSMISSION DEVICE IN A VEHICLE DRIVE TRAIN, COMPRISING AT LEAST ONE FORM-FITTING SHIFTING ELEMENT AND MULTIPLE FRICTIONALLY ENGAGED SHIFTING ELEMENTS

This application is a National Stage completion of PCT/EP2011/069555 filed Nov. 7, 2011, which claims priority from German patent application serial no. 10 2010 063 028.4 filed Dec. 14, 2010.

FIELD OF THE INVENTION

The invention relates to a method for the operation of a transmission device of a vehicle drive train, comprising at least one form-fitting shifting element and multiple frictionally engaged shifting elements.

BACKGROUND OF THE INVENTION

A transmission device that is configured as an 8-speed multi-stage transmission having frictionally engaged shifting elements, such as lamellar clutches and multi-disk brakes, is known from the document DE 10 2005 002 337 A1. When a shifting request is made for a gear change in the transmission device, at least one frictionally engaged shifting element, which is connected in the flow of power of the transmission device in order to obtain the actual gear ratio currently selected in the transmission device, must be disconnected from the flow of power of the transmission device, while at least one additional frictionally engaged shifting element, which is disconnected from the flow of power of the transmission device while obtaining the actual gear ratio currently selected in the transmission device, must be connected in order to obtain the requested actual gear ratio in the flow of power of the transmission device.

In so doing, the torque that is applied via the shift element connected in the flow of power in order to obtain the current actual gear ratio of the transmission device, is more or less transferred from the frictional shift element that must be connected in order to obtain the requested target transmission ratios with an increased shift time, while the torque that is applied via the shift element that must be disconnected decreases.

Frictionally engaged shifting elements in a disengaged operating state disadvantageously causes drag torques, which affect the overall efficiency of an automatic transmission to an undesirable extent.

For this reason, transmission devices as disclosed in what is regarded as the closes prior art, DE 10 2008 000 429 A1, are increasingly designed having not only frictional shifting elements, but also with form-fitting shifting elements in the region in which no drag torques occur that affect the overall efficiency of a transmission device.

It should also be noted, however, that form-fitting shifting elements can only be shifted from a disengaged operating state, in which no torque can be applied via the form-fitting shifting elements, into its engaged operating state, in which the entire applied torque can be applied via the form-fitting shifting elements when the form-fitting shifting elements are near their synchronization point. In addition, form-fitting shifting elements that are connected in the flow of power of a transmission device with low shift forces can only be disconnected from the flow of power when they are near their load-free operating state. In contrast to frictionally engaged shifting elements, additional structural bodies are needed, both for the synchronization of form-fitting shifting elements and for transferring form-fitting shifting elements into their load-free state, in order to be able to carry out shifts in transmission devices, in which at least one form-fitting shifting element is involved, within the desired shift times.

In order to be able to carry out a requested gear change from an actual gear ratio in the direction of a target gear ratio to the desired extent with a high shift quality or a high degree of shift comfort using the above described transmission devices, the implementation of which requires that a form-fitting shifting element be transferred from its engaged operating state into its disengaged operating state and at the same time, a frictionally engaged shifting element be transferred from its disengaged operating state into its engaged operating state, the form-fitting shifting element that is to be disconnected must be disengaged at the right point in time, that is, within an operating state window, during which the torque applied to the form-fitting shifting element is substantially at least approximately equal to zero.

If the form-fitting shifting element is disengaged by a premature or late actuation of the form-fitting shifting element, for example, there is a possibility that at least a part of the torque applied via the transmission device will be applied to the form-fitting shifting element at a predefined target moment of disengagement and the disengagement of the form-fitting shifting element in a vehicle drive train equipped with the transmission device will produce an unwanted drive train reaction as a result of the abrupt reduction in the torque applied to the form-fitting shifting element, which the driver of a vehicle that implements the vehicle drive train will perceive as an unpleasantly noticeable jolt.

Moreover, in the event of a disengagement or release attempt that is too late, wherein the transmission capability of the frictionally engaged shifting element that is to be connected is already too high, there is the possibility that the form-fitting shifting element can only be transferred into its disengaged operating state by applying undesirably high shift forces, which are caused due to high frictional forces between the inter-engaging halves of the shifting element created by tensions in the region of the transmission device.

SUMMARY OF THE INVENTION

The primary object of the present invention is therefore to provide a method for the operation of a transmission device of a vehicle drive train, comprising at least one form-fitting shifting element and multiple frictionally engaged shifting elements, by means of which it is possible in a simple manner to avoid the shift quality being affected when actuating the form-fitting shifting element that is to be disconnected.

In the case of the method according to the invention for the operation of a transmission device of a vehicle drive train comprising at least one form-fitting shifting element and multiple frictionally engaged shifting elements, which are connected or disconnected in order to obtain different transmission ratios, the form-fitting shifting element is to be changed to its disengaged operating state when a request is made to change gears from an actual transmission ratio in the direction of a target transmission ratio, wherein, in order to carry out the requested gear change, at least one form-fitting shifting element must be disconnected and at least one of the frictionally engaged shifting elements must be connected, at a predefined target moment of disengagement following a predefined target moment of disengagement.

According to the invention, an actual moment of disengagement at which the requested form fit in the region of the form-fitting shifting element is released, is determined when the gear is actually changed based on the moment the form-fitting shifting element begins to be actuated in the direction of its disengaged operating state, and in accordance with an operating state variable of the transmission device. The actual moment of disengagement is compared with the target moment of disengagement. In the event of a deviation between the actual moment of disengagement and the target moment of disengagement, the target moment of disengagement is modified by a time value, and the moment when the form-fitting shifting element begins to be actuated is shifted by the time value in relation to the target moment of disengagement and/or an actuation of the shifting element to be connected is adjusted to a determined characteristic of the operating state of the form-fitting shifting element to be disconnected such that the form-fitting shifting element reaches the disengaged operating state at least approximately at the target moment of disengagement.

As a result of the adaption according to the invention of the point in time when the form-fitting shifting element to be disconnected is disengaged, and therefore the point in time when that element is triggered, the decoupling of the form-fitting shifting element is as jolt-free as possible and a premature or late disengagement of the form-fitting shifting element with the resulting reaction torques in the vehicle drive train that impacts shift quality or shifting comfort is avoided, especially during upshifts.

In an advantageous embodiment of the method according to the invention, the target moment of disengagement, when a positive difference is determined between the actual moment of disengagement and the target moment of disengagement, is increased by the time value, and the actuation of the form-fitting shifting element is started earlier in accordance with the time value with respect to the target moment of disengagement of the form-fitting shifting element in the event of a subsequent gear change starting from the actual transmission ratio in the direction of the target transmission ratio.

By contrast, in a further advantageous embodiment of the method according to the invention, the target moment of disengagement, when a negative difference is determined between the actual moment of disengagement and the target moment of disengagement, is decreased by the time value, and the actuation of the form-fitting shifting element is started later in accordance with the time value with respect to the target moment of disengagement of the form-fitting shifting element in the event of a subsequent gear change starting from the actual transmission ratio in the direction of the target transmission ratio.

In a further embodiment of the method according to the invention that can be realized with lower design effort and economically implemented in existing transmission systems, the actual moment of disengagement is determined by a speed sensor, through which a transmission input speed and a transmission output speed can be determined, wherein the actual moment of disengagement is determined when a ratio exists between the transmission input speed and the transmission output speed that deviates from the value of the actual transmission ratio.

In a further embodiment of the method according to the invention having a low design expenditure, the actual moment of disengagement is determined by a position sensor, through which a current axial position of each of the halves of the shifting element can be determined relative to one another during the disengagement phase of the form-fitting shifting element, during which a form fit between two shifting element halves of the form-fitting shifting element is released by a relative movement in an axial direction between the halves of the shifting element.

With this embodiment, the actual moment of disengagement of the form-fitting shifting element to be disconnected can also be determined with a high degree of precision in a manner that saves installation space and is cost effective when the requested gear change is carried out starting from the actual transmission ratio in the direction of the target transmission ratio directly in the region of the form-fitting shifting element.

In a further advantageous embodiment of the method according to the invention, if a torque sensor is assigned to the form-fitting shifting element, by means of which sensor a torque currently applied via the form-fitting shifting element can be determined, when the torque currently applied via the form-fitting shifting element is less than a defined torque threshold, the actual moment of disengagement is determined with low design expenditure.

If a torque sensor is assigned to the form-fitting shifting element, by means of which sensor a differential speed between the shifting element halves of the form-fitting shifting element can be determined, the actual moment of disengagement can be determined in a cost effective manner when the differential speed is greater than a defined differential speed threshold, since transmission devices are generally designed with torque sensors for determining the indicated rotational speeds of components.

In a further advantageous embodiment of the method according to the invention, the actual acceleration behavior of a vehicle equipped with the transmission device when the gear is actually changed is determined using an acceleration sensor, with which the shift quality of the gear change can be assessed in a simple manner.

In this case, in a further embodiment of the method according to the invention, when it is determined that there is a negative deviation of a target acceleration behavior from the actual acceleration behavior of the vehicle during the gear change determined by the acceleration sensor, starting from the actual transmission ratio in the direction of the target transmission ratio, with the simultaneous determination of an actual moment of disengagement of the form-fitting shifting element to be connected, which occurs before the target moment of disengagement, is reduced by a time value and the actuation of the form-fitting shifting element is started later in accordance with the time value with respect to the target moment of disengagement of the form-fitting shifting element in the event of a subsequent gear change starting from the actual transmission ratio in the direction of the target transmission ratio, in order to improve the shift quality.

In this case, during a further embodiment of the method according to the invention, when it is determined that there is a negative deviation of a target acceleration behavior from the actual acceleration behavior of the vehicle during the gear change determined by the acceleration sensor, starting from the actual transmission ratio in the direction of the target transmission ratio, with the simultaneous determination of an actual moment of disengagement of the form-fitting shifting element to be connected, which occurs before the target moment of disengagement, the target moment of disengagement is increased by a time value and the actuation of the form-fitting shifting element is started later in accordance with the time value with respect to the target moment of disengagement of the form-fitting shifting element in the event of a subsequent gear change starting from the actual transmission ratio in the direction of the target transmission ratio, in order to improve the shift quality.

In a further advantageous embodiment of the method according to the invention, in order to be able to reliably compensate for the drive train reactions affecting shift quality that result from a premature or late actuation of the form-fitting shifting element within fewer adaptation loops, the time value is varied depending upon the amount of acceleration determined by the acceleration sensor when the gear is actually changed, starting from the actual transmission ratio in the direction of the target transmission ratio.

In order to adapt the launch time or the start of actuating the form-fitting element to be disconnected according to the invention, with the same points in the framework of operation, in further advantageous embodiments of the method according to the invention, the target moment of disengagement is adapted within a predefined speed range of a vehicle equipped with the transmission device and/or within a predefined operating temperature range of the transmission device.

Both the characteristics specified in the claims and the characteristics specified in the following embodiments of the subject according to the patent are suitable for further development either individually, or in any combination with one another. The combination of a given set of features does not represent a restriction on the development of the subject matter of the invention and is only essentially representative in nature.

BRIEF DESCRIPTION OF THE DRAWINGS

Further advantages and advantageous embodiments of the invention will be apparent from the embodiments described in principle with reference to the drawings.

They show.

DETAILED DESCRIPTION OF THE PREFERRED EMBODIMENTS

Figure 1:
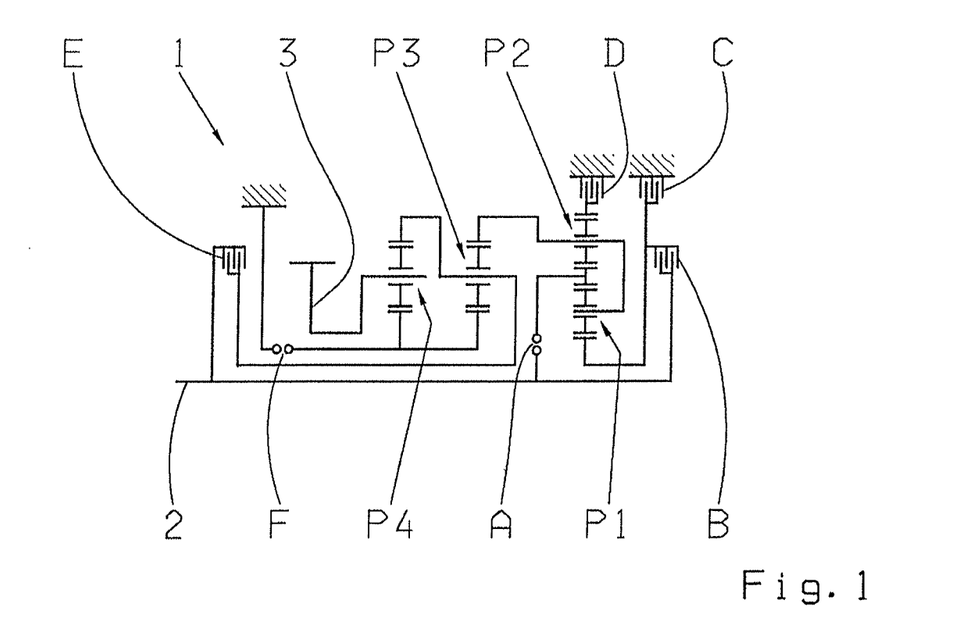
FIG. 1 a gear set diagram of a transmission device.

FIG. 1 shows a gear diagram of a transmission device 1 or of a multi-stage transmission, which is essentially known from the document DE 10 2008 000 429 A1. The transmission device 1 comprises a drive shaft 2 and an output shaft 3, which, when in an installed state in a vehicle, is connected to a vehicle output drive, while the drive shaft 2 is operatively connected to a drive motor.

Moreover, the transmission device 1 comprises four planetary gear sets, P1 to P4, wherein the first and the second planetary set P1, P2, which are advantageously designed as minus planetary gear sets, embody a shiftable front-mounted gear set, while the third and fourth planetary set P3 and P4 embody the main gear set. In addition, the transmission device 1 comprises six shifting elements A to F, of which the shifting elements C, D and F are designed as brakes and the shifting elements A, B and E are designed as shifting clutches.

Figure 2:
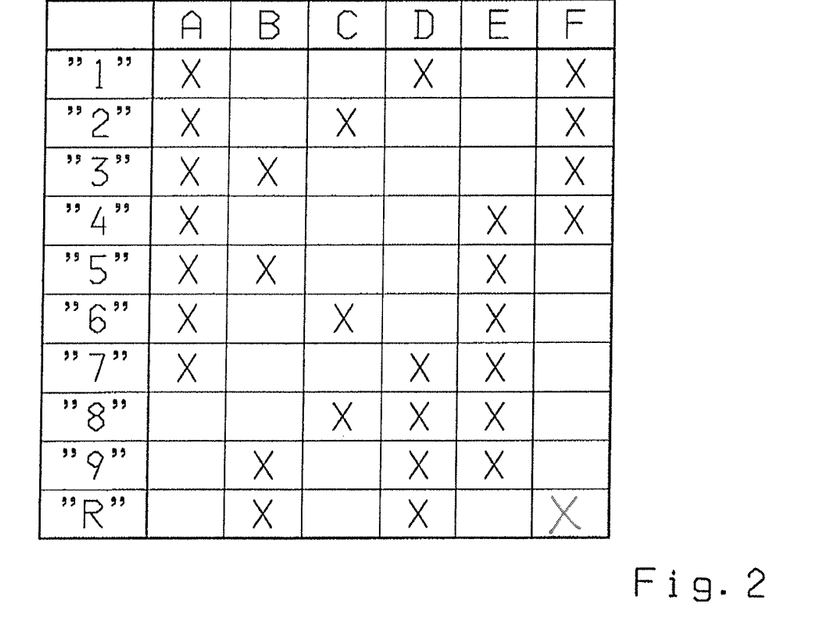
FIG. 2 a tabular shifting logic of the transmission device shown in FIG. 1.

In accordance with the shifting logic shown in detail in FIG. 2, selective shifting of nine forward gears "1" to "9" and a reverse gear "R" can be achieved with the shifting elements A to F, wherein three shifting elements must each be simultaneously incorporated or retained in an engaged operating state in order to create a flow of power in the transmission device 1.

The shifting elements A and F are presently designed as form-fitting shifting elements without additional synchronization in order to reduce drag torques caused by frictionally engaged shifting elements that are disengaged when operating the transmission device 1, as compared to transmission devices, which are designed having only frictionally engaged shifting elements. Since in general, form-fitting shifting elements can only be transferred from an engaged operating state into a disengaged operating state within a very narrow operating state window near their load-free operating state, the load-free operating state of a form-fitting shifting element that is to be disconnected is implemented without additional structural measures by appropriately actuating each of the shifting elements involved in the shifting. This applies both to traction shifting and overrun shifting operations, wherein the form-fitting shifting elements can be implemented as claw clutches, which are designed with or without additional synchronization.

The way in which the method according to the invention operates is explained in detail with reference to FIG. 3, which shows the operating state characteristics of multiple operating parameters of the transmission device 1 in accordance with FIG. 1 over time t. The method according to the invention can be used both for the monitoring and actuation of the form-fitting shifting element F when a gear change is requested starting from the fourth transmission ratio "4" in the direction of the fifth transmission ratio "5", which is implemented by connecting the frictionally engaged shifting element B and disconnecting the form-fitting shifting element F, and for the monitoring and actuation of the form-fitting shifting element A when a gear change is requested starting from the seventh transmission ratio "7" in the direction of the eighth transmission ratio step "8", which is implemented by connecting the frictionally engaged shifting element C and disconnecting the form-fitting shifting element A.

At a point in time T1, the fourth gear ratio "4" or the seventh gear ratio "7" for forward travel is engaged in the transmission device 1. At time T1, a request for a gear change is issued, starting from the currently engaged actual gear ratio "4" or "7" in the direction of the fifth gear ratio "5" or the eighth gear ratio "8" for forward travel, or the target gear ratio, wherein for this purpose, the frictionally engaged shifting element B or the shifting element C must be engaged and at the same time, the form-fitting shifting element F or the shifting element A must be transferred from its engaged operating state into its disengaged operating state.

From time T1, the transmission capacity of the frictionally engaged shifting element B or C is increased by a corresponding increase in the operating pressure p_B or p_C. The operating pressure p_B or p_C is therefore abruptly increased to a rapid filling pressure level at time T1 and maintained at this pressure level during a rapid filling phase that lasts until time T5. The operating pressure p_B or p_C is subsequently abruptly reduced to a filling compensation pressure level and kept at this pressure level during a filling compensation pressure phase that lasts until the subsequent time T6, wherein the shifting element B or C that is to be connected has an operating state at time T6, at which the transmission capacity is at least substantially almost zero and starting from which, an increase in pressure results in an immediate increase in the transmission capacity. Again from time T6, the operating pressure p_B or p_C of the shifting element B or C that is to be connected is subsequently brought to an intermediate pressure level through a pressure ramp that lasts until time T7, with which the transmission capacity of the shifting element B or C that is to be connected is increased, and additional torque is applied via the frictionally engaged shifting element B or C that is to be connected.

Figure 3:
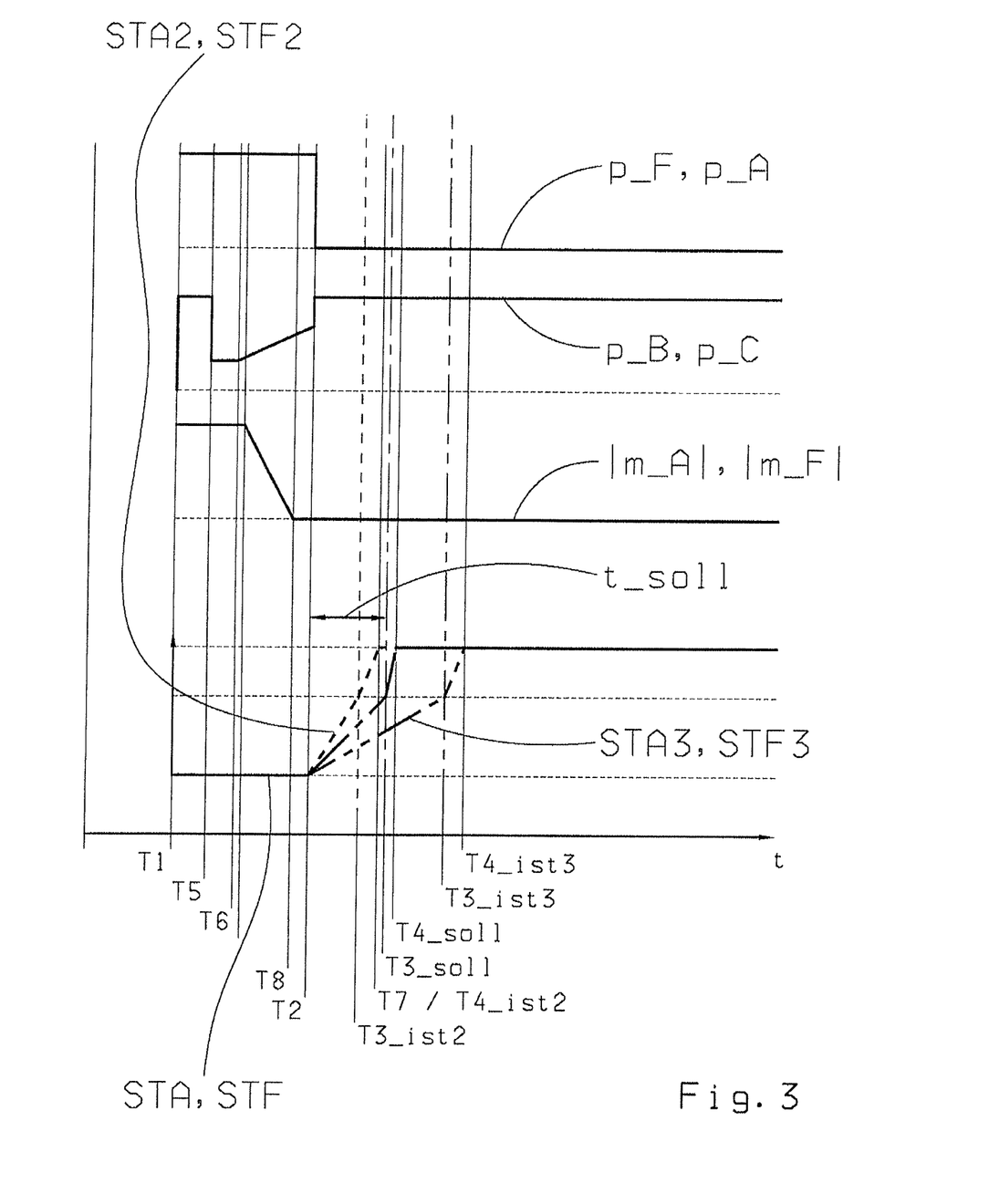
FIG. 3 multiple curves for various operating state parameters of the transmission device in accordance with FIG. 1 while implementing the requested gear change, while a form-fitting shifting element is disconnected.

The above described actuation of the shifting element B or C that is to be connected, in turn, results in a reduction in the torque applied to the form-fitting shifting element F or A that is to be connected, the amounts of which are shown in the curve |m_F| or |m_A| in FIG. 3, from time T6, and that torque is at least nearly equal to zero at time T8, whereby the form-fitting shifting element F or A that is to be disconnected is located in an operating state range needed for the disconnection.

At a further time T2, which follows the time T8, an operating pressure p_F of the form-fitting shifting element F or an operating pressure p_A of the form-fitting shifting element A is abruptly reduced from its closing pressure level to an opening pressure level in order to transfer the form-fitting shifting element F or the form-fitting shifting element A from its engaged operating state into its disengaged operating state in accordance with the present request for the gear change or the upshift starting from the fourth transmission ratio step "4" or the seventh gear ratio "7" in the direction of the fifth transmission ratio step "5" or the eighth gear ratio "8". The abrupt reduction of the operating pressure p_F or p_A of the form-fitting shifting element F or of the shifting element A represents the start of a disengagement phase of the form-fitting shifting element F or of the form-fitting shifting element A, during which a form fit between the two halves of the shifting element is released by a relative movement in an axial direction between the halves of the shifting element.

The respective presently current status of the form-fitting shifting element F or of the form-fitting shifting element A between the two halves of the shifting element is monitored by a position sensor assigned to the form-fitting shifting element F or the form-fitting shifting element A, through which sensor a current axial position of each of the halves of the shifting element in relation to one another can be determined.

The reduction of the operating pressure p_F or p_A causes one of the halves of the shifting element of the form-fitting shifting element F or A to be displaced away from the other, immovable half of the shifting element. The current position of the movable half of the shifting element of the form-fitting shifting element F or A is represented graphically by the STF or STA curve shown in FIG. 3, wherein the movable half of the shifting element of the form-fitting shifting element F or A is in its first end position before time T2, which is equivalent to the completely engaged operating state of the form-fitting shifting element F or A. From time T2, the movable half of the shifting element of the form-fitting shifting element F or A is displaced in the direction of its second end position due to the reduced operating pressure p_F or p_A, which represents a position of the movable half of the shifting element that is equivalent to the completely disengaged operating state of the form-fitting shifting element F or A.

The release of the form fit in the region of the form-fitting shifting element F or A that is to be carried out as a result of the requested gear change starting from the actual gear ratio "4" or "7" in the direction of the target gear ratio "5" or "8" is expected at a predefined target moment of disengagement T3_soll following a predefined target moment of disengagement t_soll.

Shortly before the target moment of disengagement T3_soll, the half of the shifting element of the form-fitting shifting element F or A that is designed to be movable relative to the stationary half of the shifting element is in a position in which the halves of the shifting element of the form-fitting shifting element F or A are still in a in form-fitting engagement with one another. Starting from the position of the movable half of the shifting element of the form-fitting shifting element F or A right before the target moment of disengagement T3_soll, a further axial displacement of the movable half of the shifting element away from the immovable half of the shifting element leads to the separation of the partial form fit at the target moment of disengagement T3_soll between the shifting element halves of the form-fitting shifting element F or A, wherein the form-fitting shifting element F or A is completely disengaged at the target moment of disengagement T4_soll, at which the movable half of the shifting element reaches its second end position equivalent to a completely disengaged operating state of the form-fitting shifting element F or A.

When the gear is actually changed starting from the actual gear ratio "4" or "7" in the direction of the target gear ratio "5" or "8", an actual moment of disengagement at which the requested form fit in the region of the form-fitting shifting element A or F is released is determined in accordance with the STF or STA curve, each of which represent an operating state variable of the transmission device 1, starting at time T2, which represents the start of actuation of the form-fitting shifting element F or A.

If the requested gear change is performed between times T2 and T4_soll in accordance with the target specification stored in the transmission control of the transmission device 1, the curve described in detail under reference characters STF1 or STA1 goes into effect, wherein the actual moment of disengagement of the form-fitting shifting elements F or A corresponds to the target moment of disengagement T3_soll.

Reference character STF2 or STA2 shows an actual curve that deviates from the target curve STF1 or STA1, which goes into effect when the requested gear change is carried out, if the form fit is released in the region of the form-fitting shifting element F or A by the presence of the operating pressure p_F or p_A before the target moment of disengagement T3_soll. In this case, the actual moment of disengagement T3_ist2 of the form-fitting shifting element F or A deviates from the target moment of disengagement T3_soll in the manner shown in FIG. 3, wherein the form-fitting shifting element F or A is also completely disengaged at an early time T4_ist2.

A further actual curve of the position of the movable half of the shifting element of the form-fitting shifting element F or A, which is more closely specified with the reference characters STF3 or STA3, goes into effect after time T2, when the form fit in the region of the form-fitting shifting element F or A that is to be released by the requested gear change is first separated at an actual moment of disengagement T3_ist3 that is after the target moment of disengagement T3_soll, wherein the form-fitting shifting element F or A is then only completely disengaged at time T4_ist3, at which the movable half of the shifting element has reached its second end position that is equivalent to the completely disengaged operating state of the form-fitting shifting element F or A At time T2, from which the actuation of the form-fitting shifting element F or A begins, time monitoring is simultaneously started that, in connection with the sensor signal from the position sensor, is used to determine the actual moment of disengagement T3_ist2 or T3_ist3 in the manner described in greater detail below.

Between time T2 and the target moment of disengagement T3_soll, the actual moment of disengagement T3_ist2 or the actual moment of disengagement T3_ist3, a form fit exists in the region of the form-fitting shifting element F or A that is to be disengaged on the basis of the requested gear change, so the movable half of the shifting element of the form-fitting shifting element F or A is moved in this area with a lower adjustment speed than after the target moment of disengagement T3_soll or the respective actual moment of disengagement T3_ist2 or T3_ist3. This is due to the fact that the adjustment speed is slowed due to frictional contact between the halves of the shifting element of the form-fitting shifting element F or A before the target moment of disengagement T3_soll or the actual moment of disengagement T3_ist2 or T3_ist3, before which the two halves of the shifting element of the form fitting shifting element F or A are engaged in a form fit with one another.

The target moment of disengagement T3_soll or the actual moment of disengagement T3_ist2 or T3_ist3 can thus be precisely determined upon detection of the change in the gradients of the STF2 and STA2, or STF3 and STA3 curves in connection with the time monitoring.

The currently determined actual moment of disengagement T3_ist2 or T3_ist3 is compared with the target moment of disengagement T3_soll. If a deviation between the actual moment of disengagement T3_ist2 or T3_ist3 and the target moment of disengagement T3_soll that affects the shift quality of the gear change being carried out is detected, the target moment of disengagement t_soll is modified by a time value, and the start of the actuation or the time T2 of the form-fitting shifting element F or A for a subsequent gear change starting from the actual gear ratio "4" or "7" in the direction of the target gear ratio "5" or "8" is shifted by the time value in relation to the target moment of disengagement T3_soll.

The deviations between the target moment of disengagement T3_soll and the actual moment of disengagement T3_ist2 or T3_ist3 that affect the shift quality are perceptible by a driver of a vehicle equipped with the transmission device 1, for example in the form of unevenness in the curve of the vehicle acceleration, such as gear-shifting jolts or the like, and are perceived by the driver as disruptive.

An acceleration sensor is provided in order to detect a deviation that affects the shift quality, with which an actual acceleration curve of a vehicle equipped with the transmission device 1 can be determined when the gear is actually changed.

If a negative deviation of the actual curve of the longitudinal acceleration of the vehicle from the target curve caused by the gear change is determined when the gear is actually changed, wherein the deviation is caused by a form fit in the area of the form-fitting shifting element F or A that is prematurely released at the actual moment of disengagement T3_ist2 with respect to the target moment of disengagement T3_soll, then the target moment of disengagement t_soll is decreased by the time value and the actuation of the form-fitting shifting element F or A is started later in accordance with the time value with respect to the target moment of disengagement T3_soll of the form-fitting shifting element F or A in the event of a subsequent gear change starting from the actual gear ratio "4" or "7" in the direction of the target gear ratio "5" or "8".

By contrast, if a negative deviation of the actual curve of the longitudinal acceleration of the vehicle from the target curve caused by the gear change is determined, wherein the deviation is caused by a form fit in the region of the form-fitting shifting element F or A that is initiated too late at the actual moment of disengagement T3_ist3 with respect to the target moment of disengagement T3_soll, then the target moment of disengagement t_soll is increased by the time value and the actuation of the form-fitting shifting element F or A is started earlier in accordance with the time value with respect to the target moment of disengagement T3_soll of the form-fitting shifting element F or A in the event of a subsequent gear change starting from the actual gear ratio "4" or "7" in the direction of the target gear ratio "5" or "8". The above described approach is the result of the fact that a negative acceleration of the vehicle is caused by the form-fitting element F or A disengaging too late with respect to the target moment of disengagement T3_soll, for example at the actual moment of disengagement T3_ist3, and the nominal value stored in the transmission control must be modified in order to improve the shift quality.

Depending on the particular case of application, the time value is varied depending upon the amount of vehicle acceleration determined by the acceleration sensor when the gear is actually changed starting from the actual gear ratio "4" or "7" in the direction of the target gear ratio "5" or "8" such that the target moment of disengagement t_soll is modified by a larger time value when higher acceleration rates are detected than when lower acceleration rates are detected.

Both premature and late disengagement of the form-fitting shifting element F or A with respect to the nominal value is the result of application failures, for example, which can easily be compensated for through the prescribed approach within short operating times.

In order to improve the shift quality, the target moment of disengagement t_soll is increased by the time value when a positive difference is determined between the actual moment of disengagement T3_ist3, and the target moment of disengagement T3_soll and the actuation of the form-fitting shifting element F or A is started earlier in accordance with the time value with respect to the target moment of disengagement T3_soll of the form-fitting shifting element F or A in the event of a subsequent gear change starting from the actual gear ratio "4" or "7" in the direction of the target gear ratio "5" or "8". By contrast, the target moment of disengagement t_soll is decreased by the time value when a negative difference is determined between actual moment of disengagement T3_ist2 and the target moment of disengagement T3_soll, and the actuation of the form-fitting shifting element F or A is started later in accordance with the time value with respect to the target moment of disengagement T3_soll of the form-fitting shifting element F or A in the event of a subsequent gear change starting from the actual gear ratio "4" or "7" in the direction of the target gear ratio "5" or "8".

Alternatively, or in addition to the above described approach, the determination as to whether the form-fit in the region of the form-fitting shifting element F or A to be connected is triggered too early or too late with respect to the target moment of disengagement T3_soll, can instead be made via an acceleration sensor or in addition also via a torque sensor, through which a transmission input speed of the transmission device 1 can be determined when the requested gear change is carried out starting from the actual gear ratio "4" or "7" in the direction of the target gear ratio "5" or "8". A premature disconnection of the form-fitting shifting element F or A is thereby detected via the torque sensor when the curve of the transmission input speed during the requested upshift from a synchronous speed of the transmission input speed, which starts at the actual operating point of the transmission device 1 when the actual gear ratio "4" or "7" is engaged, does not run in the direction of the synchronous speed, which starts when the target gear ratio "5" or "8" is engaged. This is the case when the transmission capability of the frictionally engaged shifting element B or C to be connected is still too low for the proposed load transfer.

If the form-fitting shifting element F or A disengages too late with respect to the target moment of disengagement T3_soll, this is detected by the torque sensor when the transmission input speed is changed from the synchronous speed of the transmission input speed of the target gear ratio "4" or "7" to the level of the synchronous speed of the transmission speed of the target gear ratio "5" or "8" after the disconnection of the form-fitting shifting element F or A with a large gradient in the curve of the transmission speed.

In addition, it is also possible to detect the actual moment of disengagement using a torque sensor instead of a position sensor or the additional use of the signal from the position sensor, via which torque sensor a transmission input speed and a transmission output speed can be determined. In so doing, the actual moment of disengagement is determined when there is a ratio between the transmission input speed and the transmission output speed that deviates from the value of the actual gear ratio "4" or "7". With this approach, in addition to a premature or late dissolution of the form-fit in the region of the form-fitting shifting element F or A to be disengaged by calling on a further sensor signal, for example a signal from an acceleration sensor or a torque sensor, through which a torque currently applied via the form-fitting shifting element F or A or torque applied to the transmission output can be determined, an assessment of the effect generated by the premature or late disconnection of the form-fitting shifting element F or A can also be made, wherein the target moment of disengagement t_soll can likewise be adapted in the above described manner with increased or decreased time values.

Again depending on the particular application, in a further embodiment of the method according to the invention, provisions are made to allow the actual moment of disengagement to be determined via a torque sensor assigned to the form-fitting shifting element, by means of which a torque currently applied via the form-fitting shifting elements can be determined. The actual moment of disengagement is then determined when a torque is currently being applied via the form-fitting shifting element F or A that is less than a defined torque threshold, which is preferably equal to zero, wherein an assessment of the impact of a premature or late disconnection of the of the form-fitting shifting element F or A, in turn, can be provided in the accompaniment of an additional sensor signal such as the signal from an acceleration sensor or a torque sensor.

If a torque sensor is assigned to the form-fitting shifting element F or A, by means of which a differential speed between the shifting element halves of the form-fitting shifting element can be determined, the actual moment of disengagement is determined when there is a current differential speed that is greater than a defined differential speed threshold, which is preferably equal to zero. In this embodiment of the method according to the invention, an assessment can also be made of the reaction torques on the drive train side triggered by the premature or late disconnection of the form-fitting shifting element F or A depending on at least one further sensor signal, such as a longitudinal acceleration sensor device for determining vehicle acceleration, an additional torque sensor for determining a transmission input speed and a transmission output speed or a torque sensor for determining the torque currently applied via the form-fitting shifting element to be disengaged.

Alternatively, or in addition to changing when the actuation of the form-fitting shifting element F or A to be disconnected starts, there is also an option of adapting the actuation of the shifting element B or C to be connected to the characteristic of the operating state of the form-fitting shifting element F or A to be disconnected when the gear is actually changed in such a way that the form-fitting shifting element F or A reaches the disengaged operating state at least approximately at the target moment of disengagement.

In the actuation of the frictionally engaged shifting element B or C to be connected shown in FIG. 3, the operating pressure p_B or p_C is already increased at time T7 from the intermediate pressure level at which the frictionally engaged shifting element B or C to be connected is already advantageously in its slip-free operating state, to the engaging pressure level, at which the frictionally engaged shifting element B or C to be connected has its full transmission capability, at which the frictionally engaged shifting element B or C is completely connected and at which, in principle, the entire torque to be applied via the transmission device 1 in the region of the frictionally engaged shifting element B or C can be transferred.

The result is that there is a torque applied to the form-fitting shifting element to be connected that affects the disconnection process despite proper actuation of the shifting element F or A to be disconnected, and tensions states exist in the transmission device 1 when the form-fit is not yet disengaged in the region of the form-fitting shifting element F or A to be disconnected at time T7. These tension states can delay the disengagement of the form-fitting shifting element F or A to be disconnected, whereby this element does not go into the disengaged operating state at the target moment of disengagement T3_soll in accordance with the target specification.

If the form-fitting shifting element F or A to be disconnected goes into its disengaged operating state at a later time when tension conditions exist, the tensions are abruptly reduced and affect driving comfort to a degree that may be noticeable to the driver, depending on how high the tension condition is.

In order to avoid tension conditions in general, despite an actuation of the form-fitting shifting element F or A to be disconnected in accordance with the target specification, or when the actuation of the form-fitting shifting element F or A to be disconnected deviates from the target specification, the actuation of the shifting element B or C to be connected is adapted to the determined characteristic of the operating state of the form-fitting shifting element F or A to be disconnected when the gear is actually changed in such a way that the tension conditions that prevent the proper disconnection of the form-fitting shifting element to be disconnected are not created by connecting the frictionally engaged shifting element B or C.

In general, the above described embodiments of the method according to the invention could usefully be carried out only when there is a stable transmission input speed gradient. If a driver-side performance requirement is issued during the adaption of the target moment of disengagement or if the driver actuates the brake pedal, the calculation of the adaption is discarded.

Moreover, the adaption is essentially carried out with the same points in the framework of operation, that is, preferably within a predefined speed range of a vehicle equipped with the transmission device 1 and/or within a predefined operating temperature range of the transmission device 1.

By using the method according to the invention, it is ensured that a suitable adaptation is adjusted and thus, the moment when the form-fitting shifting element, or the kick-off point for improving shift quality, begins to be actuated is modified accordingly. This makes it possible to avoid a late disconnection of the form-fitting shifting element with an excessive applied torque, for example, with all of its negative effects such as an impairment of a desired shift comfort, with low control and regulation effort.

In order to implement the method according to the invention or to adapt the time at which the disengagement process of a form-fitting shifting element is triggered, information from sensors such as an acceleration sensor signal or a longitudinal acceleration sensor signal, torque sensor signal, position sensor and/or indicated rotational speed sensor signal are used, wherein one of the sensor signals is sufficient to carry out the assessment. Nevertheless it is possible to implement a differentiated assessment using a combination of multiple sensor signals depending upon the case of application, wherein the individual assessments can preferably be accounted for with different values.

The above described embodiments of the method according to the invention are essentially suitable for determining a premature or late actual moment of disengagement of the form-fitting shifting elements, in which both halves of the shifting element are designed to be movable.

Reference Characters 1 transmission device
2 drive shaft
3 output shaft
"1" to "9" gear ratio for forward travel
A to F shifting element
|m _A|, |m_F| Characteristic of the torque applied to the form-fitting shifting element A or F to be disconnected
p_A, p_B,
p_C, p_F operating pressure
P1 to P4 planetary set
"R", gear ratio for reverse travel
STA, STF curve of the position of the half of the shifting element of the movable form-fitting shifting element A or F
t time
t_soll target moment of disengagement
T1, T2 discrete point in time
T3_soll target moment of disengagement
T4_soll definitive target moment of disengagement
T3_ist2,
T3_ist3 actual moment of disengagement
T4_ist2,
T4_ist3 definitive actual moment of disengagement
T5 to T8 discrete point in time

The invention claimed is:

1. A method of operating a transmission device (1), of a vehicle drive train, comprising at least one form-fitting shifting element (A, F) and a plurality of frictionally engaged shifting elements (B, C, D, E) which are either connected or disconnected to obtain different transmission ratios ("1" to "R"), the method comprising the steps of:
when a request is made for a gear change from an actual gear ratio to a target gear ratio, disconnecting the form-fitting shifting element (F or A) and connecting at least one of the frictionally engaged shifting elements (B or C) to carry out the requested gear change, and the form-fitting shifting element (F or A) that is to be disengaged, as a result of the requested gear change, being in a disengaged state at a predefined desired moment of disengagement (T3_soll) following a predefined desired span of time of disengagement (t_soll) for the disengaged operating state;
determining an actual moment of disengagement (T3_ist2; T3_ist3) at which a required form fit in a range of the form-fitting shifting element (F or A) is released, when the gear change actually occurs, based on a moment the form-fitting shifting element (A or F) begins to be actuated, in a direction of its disengaged operating state, and in accordance with an operating state variable (STA or STF) of the transmission device (1);
comparing the actual moment of disengagement (T3_ist2; T3_ist3) with the desired moment of disengagement (T3_soll);
modifying the desired moment of disengagement (T3_soll) by a time value, if there is a deviation between the actual moment of disengagement (T3_ist2; T3_ist3) and the desired moment of disengagement (T3_soll); and
at least one of shifting the moment at which the form-fitting shifting element (F or A) begins to be actuated by the time value in relation to the desired moment of disengagement (T3_soll) and adjusting actuation of the shifting element (B or C) to be connected to a determined characteristic of the form-fitting shifting element (F or A) to be disconnected such that the form-fitting shifting element (F or A) reaches the disengaged operating state at least approximately at the desired moment of disengagement (T3_soll).

2. The method according to claim 1, further comprising the step of increasing a target moment of disengagement (t_soll) by the time value, when a positive difference is determined between the actual moment of disengagement (T3_ist2; T3_ist3) and the target moment of disengagement (T3_soll), and starting the actuation of the form-fitting shifting element (F or A) earlier in accordance with the time value with respect to the target moment of disengagement (T3_soll) of the form-fitting shifting element (F or A) in the event of a subsequent gear change starting from the actual gear ratio to the target gear ratio.

3. The method according to claim 1, further comprising the step of decreasing the target moment of disengagement (t_soll) by the time value, when a negative difference is determined between actual moment of disengagement (T3_ist2; T3_ist3) and the target moment of disengagement (T3_soll), and staring the actuation of the form-fitting shifting element (F or A) later in accordance with the time value with respect to the target moment of disengagement (T3_soll) of the form-fitting shifting element (F or A) in an event of a subsequent gear change starting from the actual gear ratio in the direction of the target gear ratio.

4. The method according to claim 1, further comprising the step of determining the actual moment of disengagement by a speed sensor, via which a transmission input speed and a transmission output speed are determined, and, if a ratio between the transmission input speed and the transmission output speed deviates from a value of the actual gear ratio, determining the actual moment of disengagement.

5. The method according to claim 1, further comprising the step of determining the actual moment of disengagement (T3_ist2; T3_ist3) of the form-fitting shifting element with a position sensor, by which a current axial position of each half of the form-fitting shifting element is determined relative to one another during a disengagement phase of the form-fitting shifting element (F or A), during which a form fit, between the two shifting element halves of the form-fitting shifting element (F or A), is released by relative movement in an axial direction between the halves of the form-fitting shifting element.

6. The method according to claim 1, further comprising the step of determining a torque currently applied to the form-fitting shifting element with a torque sensor that is assigned to the form-fitting shifting element, and, if an actual torque applied to the form-fitting shifting element is less than a defined threshold, determining the actual moment of disengagement.

7. The method according to claim 1, further comprising the step of determining a differential speed between shifting element halves of the form-fitting shifting element with a torque sensor assigned to the form-fitting shifting element, and, if an actual differential speed between the shifting element halves of the form-fitting shifting element is greater than a defined differential speed threshold, determining the actual moment of disengagement.

8. The method according to claim 1, further comprising the step of determining an actual acceleration curve of the vehicle equipped with the transmission device (1) with an acceleration sensor when the gear change actually occurs.

9. The method according to claim 8, further comprising the step of when the acceleration sensor determines that there is a negative deviation in a target acceleration curve from the actual acceleration curve of the vehicle, during the gear change starting from the actual gear ratio in the direction of the target gear ratio, while simultaneously determining an actual moment of disengagement (T3_ist3) that temporally precedes the target moment of disengagement (T3_soll), reducing the target moment of disengagement (t_soll) by the time value and starting the actuation of the form-fitting shifting element (F or A) later in accordance with the time value with respect to the target moment of disengagement (T3_soll) of the form-fitting shifting element (F or A) in an event of a subsequent gear change, starting from the actual gear ratio in the direction of the target gear ratio.

10. The method according to claim 8, further comprising the step of when the acceleration sensor determines that there is a negative deviation in a target acceleration curve from the actual acceleration curve of the vehicle determined during the gear change starting from the actual gear ratio in the direction of the target gear ratio while simultaneously determining an actual moment of disengagement (T3_ist3) that temporally precedes the target moment of disengagement (T3_soll), increasing the target moment of disengagement (t_soll) by the time value and starting the actuation of the form-fitting shifting element (F or A) earlier in accordance with the time value with respect to the target moment of disengagement (T3_soll) of the form-fitting shifting element (F or A) in the event of a subsequent gear change starting from the actual gear ratio in the direction of the target gear ratio.

11. The method according to claim 8, further comprising the step of varying the time value by an amount of acceleration determined by the acceleration sensor, when the gear change actually occurs starting from the actual gear ratio in the direction of the target gear ratio.

12. The method according to claim 1, further comprising the step of adapting the target moment of disengagement (T3_soll) within a predefined speed range of a vehicle equipped with the transmission device (1).

13. The method according to claim 1, further comprising the step of adapting the target moment of disengagement (T3_soll) within a predefined operating temperature range of the transmission device.

14. A method of changing gears of a transmission device (1) of a vehicle drive train from an initial gear ratio to a target gear ratio, the transmission device having at least one form-fitting shifting element (A, F) and a plurality of frictional shifting elements (B, C, D, E) which are either selectively connected or disconnected to implement a plurality of transmission gear ratios ("1" to "R"), the method comprising the steps of:

requesting a change of gears from the initial gear ratio to the target gear ratio, the requested change of gears being accomplished by disengaging the at least one form-fitting shifting element (F or A) from a fully engaged state and engaging one of the frictional shifting elements from a fully disengaged state;

initiating disengagement of the form-fitting shifting element (F or A) at a disengagement starting time point, the form-fitting shifting element being fully disengaged at a predefined desired disengagement time point (T3_soll) upon the passage of a predefined desired disengagement time span (t_soll) during which the form-fitting shifting element is disengaging;

determining an actual disengagement time point (T3_ist2; T3_ist3) at which the form-fitting shifting element (F or A) will be fully disengaged based on the disengagement starting time point and in accordance with an operating state variable (STA or STF) of the transmission device (1);

comparing the actual disengagement time point (T3_ist2; T3_ist3) with the predefined desired disengagement time point (T3_soll);

modifying the predefined desired disengagement time span (T3_soll) by a time value, if there is a different between the actual disengagement time point (T3_ist2; T3_ist3) and the predefined desired disengagement time point (T3_soll), by at least one of adjusting the disengagement starting time point by the time value in relation to the predefined desired disengagement time point (T3_soll) and adjusting the disengagement starting time point according to a determined characteristic of the form-fitting shifting element (F or A) such that the form-fitting shifting element (F or A) is fully disengaged at least approximately at the predefined desired disengagement time point (T3_soll).

* * * * *